US012605735B2

(12) United States Patent
Schroder

(10) Patent No.: US 12,605,735 B2
(45) Date of Patent: Apr. 21, 2026

(54) DISPENSING SYSTEM WITH CONTROLLED DELIVERY AND ASSOCIATED METHODS

(71) Applicant: Pella Corporation, Pella, IA (US)

(72) Inventor: Paul D. Schroder, Pella, IA (US)

(73) Assignee: Pella Corporation, Pella, IA (US)

( * ) Notice: Subject to any disclaimer, the term of this patent is extended or adjusted under 35 U.S.C. 154(b) by 236 days.

(21) Appl. No.: 17/940,375

(22) Filed: Sep. 8, 2022

(65) Prior Publication Data

US 2023/0075156 A1 Mar. 9, 2023

Related U.S. Application Data

(60) Provisional application No. 63/241,936, filed on Sep. 8, 2021.

(51) Int. Cl.

*B05C 17/015* (2006.01)
*B05B 12/08* (2006.01)
*B05C 11/10* (2006.01)
*B05D 1/26* (2006.01)

(52) U.S. Cl.

CPC ............ *B05C 17/015* (2013.01); *B05B 12/08* (2013.01); *B05C 11/1002* (2013.01); *B05D 1/26* (2013.01)

(58) Field of Classification Search

USPC ................................ 118/300, 684, 692, 712
See application file for complete search history.

(56) References Cited

U.S. PATENT DOCUMENTS 4,702,931 A 10/1987 Falcoff
5,278,423 A 1/1994 Wangler et al.
5,747,102 A * 5/1998 Smith .................. G01F 13/006 228/102
5,951,296 A 9/1999 Klein
6,758,423 B1 7/2004 Perkins et al.
6,977,372 B2 12/2005 Valaskovic et al.
7,244,464 B2 7/2007 Robens et al.
7,311,004 B2 12/2007 Giles
7,839,416 B2 11/2010 Ebensberger et al.
7,839,417 B2 11/2010 Ebensberger et al.
7,981,462 B2 7/2011 Bustgens
(Continued)

FOREIGN PATENT DOCUMENTS

EP 3434594 A1 * 1/2019 .............. B05B 1/28
WO 2018136499 7/2018
WO 2019055821 3/2019

OTHER PUBLICATIONS

English Translation EP 3434594A1 (Year: 2019).*

*Primary Examiner* — Yewebdar T Tadesse

(57) ABSTRACT

A fluid dispensing system includes a housing, an inertial measurement unit supported by the housing and operable to sense linear and rotational acceleration of the housing, a nozzle supported by the housing operable to expel a fluid, a pressure source in fluid communication with the housing and the nozzle and operable to pressurize the fluid, a valve positioned fluidically upstream from the nozzle and operable to regulate fluid flow to the nozzle, and a controller in operable to receive an application value relating to a predetermined volume of fluid to be applied to a surface of an article, to receive movement data relating to the linear and rotational acceleration of the housing sensed by the inertial measurement unit, and to regulate the valve based on the movement data and the application value.

20 Claims, 7 Drawing Sheets

(56) References Cited

U.S. PATENT DOCUMENTS

| | | | |
|---|---|---|---|
| 8,050,799 B2 | 11/2011 | Eickmeyer et al. | |
| 8,154,711 B1 | 4/2012 | Scheer | |
| 8,875,655 B2 | 11/2014 | Pettersson et al. | |
| 9,245,163 B2 | 1/2016 | Thwing et al. | |
| 9,476,902 B2 | 10/2016 | Temko et al. | |
| 9,844,792 B2 | 12/2017 | Pettersson et al. | |
| 9,914,150 B2 | 3/2018 | Pettersson et al. | |
| 10,368,538 B2 | 8/2019 | Preheim et al. | |
| 10,549,301 B2 | 2/2020 | Scott | |
| 10,909,876 B2 | 2/2021 | Richardson et al. | |
| 2005/0048206 A1* | 3/2005 | Chinander | B05C 17/0103 118/679 |
| 2005/0100680 A1 | 5/2005 | Bustgens | |
| 2007/0069041 A1 | 3/2007 | Quinones et al. | |
| 2008/0124698 A1 | 5/2008 | Ebensberger et al. | |
| 2008/0125909 A1 | 5/2008 | Eickmeyer et al. | |
| 2010/0077959 A1 | 4/2010 | Treloar et al. | |
| 2010/0143089 A1 | 6/2010 | Hvass et al. | |
| 2010/0152880 A1* | 6/2010 | Boyden | A61K 38/38 700/283 |
| 2013/0323695 A1 | 12/2013 | Zboray et al. | |
| 2016/0178422 A1 | 6/2016 | Humpal et al. | |
| 2018/0192167 A1 | 7/2018 | Lange et al. | |
| 2019/0029170 A1 | 1/2019 | Wilger | |
| 2019/0100425 A1 | 4/2019 | Paar et al. | |
| 2020/0230632 A1 | 7/2020 | Kieffer et al. | |

* cited by examiner

DISPENSING SYSTEM WITH CONTROLLED DELIVERY AND ASSOCIATED METHODS

CROSS REFERENCE TO RELATED APPLICATION

This application claims priority to Provisional Application No. 63/241,936, filed Sep. 8, 2021, which is herein incorporated by reference in its entirety.

BACKGROUND

Dispensing units are used for application of substances to surfaces in many industries and for many applications. Even experienced technicians can be limited in their ability to provide a uniform coating to the surface. Experienced and especially inexperienced technicians can create inefficiencies both from a materials and time standpoint. For example, sealants are applied manually in many places and on many products, including fenestration units such as doors and windows. It is often important to have sufficient sealant to produce a reliable seal, but not so much as to cause squeeze-out. Insufficient sealant can result in product quality issues that impact usability, function, efficiency, cost, and reputation. Excessive sealant costs both in terms of excessive material cost as well as in the cost of cleanup, or aesthetic appearance. It is difficult with current equipment for operators to dispense the specified bead size repeatably. Operator rotation and the variability in operator performance further exacerbates the difficulty of repeatable, consistent results.

SUMMARY

Various aspects of this disclosure relate to a dispensing gun and system that is operable to provide a uniform application of a dispensed material to a surface when accelerations and/or changes in orientation of the dispensing gun are experienced. For example, the disclosure relates to fluid dispensing systems that are operable to control the fluid delivery rate to produce coverage or a bead that has a desired uniformity, or at least an enhanced uniformity relative to manually controlled systems.

In some examples, a fluid dispensing system includes a housing, an inertial measurement unit supported by the housing and operable to sense linear and rotational acceleration of the housing, a nozzle supported by the housing operable to expel a fluid, a pressure source in fluid communication with the housing and the nozzle and operable to pressurize the fluid, a valve positioned fluidically upstream from the nozzle and operable to regulate fluid flow to the nozzle, and a controller operable to receive an application value relating to a predetermined volume of fluid to be applied to a surface of an article, to receive movement data relating to the linear and rotational acceleration of the housing sensed by the inertial measurement unit, and to regulate the valve based on the movement data and the application value.

In some examples, the fluid dispensing system further includes a processor operable to calculate a velocity of the nozzle based on the movement data.

In some examples, the processor of fluid dispensing system is operable to determine orientation of the nozzle based on the movement data.

In some examples, the fluid dispensing system further includes a valve actuator operable to actively control the valve.

In some examples, the fluid dispensing system further includes a pressure sensor at an upstream position in fluid communication with the fluid proximate the nozzle.

In some examples, the controller of fluid dispensing system is operable to regulate the valve based on a pressure sensed by the pressure sensor.

In some examples, the controller of fluid dispensing system is operable to adjust delivery rate of the fluid based on the pressure sensed by the pressure sensor.

In some examples, the nozzle of fluid dispensing system is operable to expel a sealant that forms a sealant bead to the surface.

In some examples, the fluid dispensing system further includes an adapter operable to couple the housing to the article and maintain the nozzle a predefined distance from the surface of the article.

In some examples, a dispensing gun includes a housing, an inertial measurement unit supported by the housing and operable to sense linear and rotational velocity of the housing, a nozzle supported by the housing operable to expel a fluid, a valve supported by the housing and positioned fluidically upstream from the nozzle and operable to regulate fluid flow to the nozzle, and a controller operable to receive an application value relating to a predetermined volume of fluid to be applied to a predetermined area, to receive movement data relating to the linear and rotational velocity of the housing sensed by the inertial measurement unit, and to regulate the valve based on the movement data and the application value.

In some examples, the dispensing gun further includes a processor operable to calculate a velocity of the nozzle based on the movement data, the processor being supported on the housing.

In some examples, the processor of the dispensing gun is operable to perform a coordinate transfer of the movement data to a coordinate system to determine an orientation of the nozzle.

In some examples, the dispensing gun further includes a valve actuator operable to actively control the valve, the valve actuator being infinitely adjustable.

In some examples, the valve actuator of the dispensing gun is operable to be adjusted based on the movement data in order to provide a desired flow rate through the nozzle.

In some examples, the dispensing gun further includes a pressure sensor in fluid communication with the fluid proximate the nozzle.

In some examples, the controller of the dispensing gun is operable to regulate the valve based on a pressure sensed by the pressure sensor.

In some examples, the controller of the dispensing gun is operable to adjust delivery rate of the fluid based on the pressure sensed by the pressure sensor.

In some examples, the nozzle of the dispensing gun is operable to expel a sealant that forms a sealant bead to the surface.

In some examples, the dispensing gun further includes an adapter operable to couple the housing to the article and maintain the nozzle a predefined distance from the surface of the article.

In some examples, the controller of the dispensing gun is operable to calibrate the valve based on sensed pressures.

In some examples, a method of regulating fluid flow from a fluid dispensing system includes setting an application value relating to a predetermined volume of a fluid to be applied to a predetermined area of a surface, pressurizing the fluid, sensing movement data relating to linear and rotational acceleration of a housing, determining a valve setting of a valve based on movement data, and modulating the valve in response to the linear and rotational acceleration of the housing to provide the predetermined value of fluid to the predetermined area of the surface.

While multiple examples illustrative of inventive concepts of this description are specifically disclosed, various modifications and combinations of features from those examples will become apparent to those skilled in the art. Accordingly, the examples specifically discussed herein are meant to be regarded as illustrative in nature and are not to be read in a restrictive manner.

Figure 1:
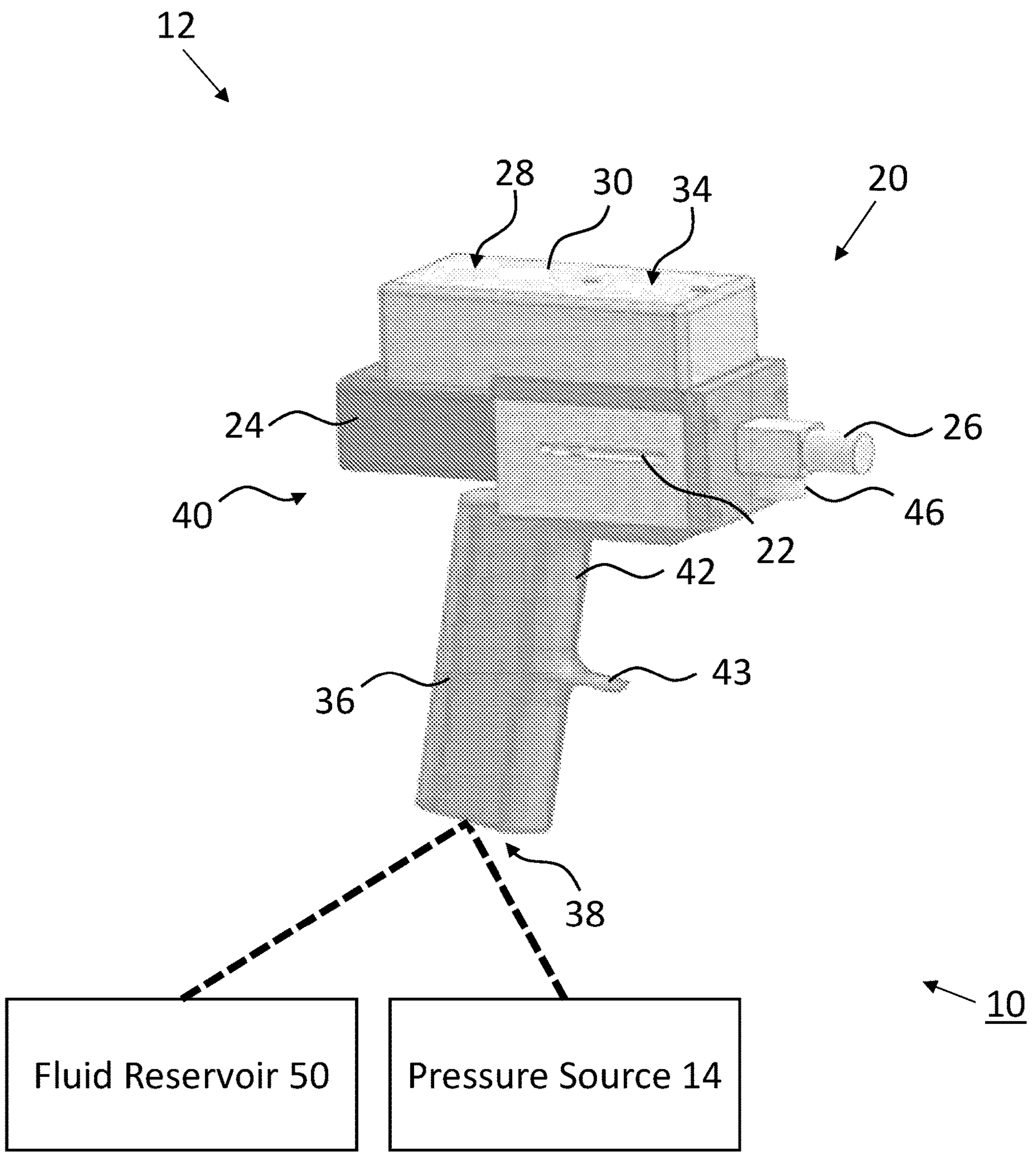
FIG. 1 is a perspective view of an embodiment of a fluid dispensing system including a dispensing gun and a pressure source, according to some examples.

While the disclosure is amenable to various modifications and alternative forms, specific embodiments have been shown by way of example in the drawings and are described in additional detail below. The disclosure, however, is not limited to the particular embodiments described. On the contrary, the disclosure is intended to cover all modifications, equivalents, and alternatives falling within the scope of the inventive concepts provided herewith.

DETAILED DESCRIPTION

Fluid dispensing systems according to various examples provided in this description may be adapted for sealant, paint, coatings, or any other fluid that is delivered via a dispensing system. A fluid dispensing system that provides a substantially uniform coating on a surface can provide efficiencies in material costs and personnel training, accurate predetermined coatings despite potential inconsistencies of a user, and therefore more uniform products, better performance, and even a more aesthetically appealing appearance. As used herein, the term "fluid" incorporates a variety of materials that are not intended to be limiting, including liquids and gasses such as gels, aerosols, sealants, paints, coatings, treatments, and so forth.

FIG. 1 is a view of a fluid dispensing system 10 in accordance with one embodiment. The fluid dispensing system 10 generally includes a dispensing gun 12 and a pressure source 14. The dispensing gun 12 is fluidly coupled to a fluid reservoir 50 and the pressure source 14 and is operable to receive pressurized fluid which is then expelled from the dispensing gun 12. The dispensing gun 12 is operable to expel the fluid onto a surface in a controlled manner. For example, the dispensing gun 12 expel sealant to form a sealant bead on a surface. The dispensing gun 12 is operable to modulate the flow rate of the fluid expelled from the dispensing gun 12 to provide a uniform coating and/or bead of fluid to the surface. As the dispensing gun 12 is moved through space and/or oriented in various directions, the dispensing gun 12 is operable to provide varying flow rates of the fluid based on the velocity, acceleration, and/or orientation of the dispensing gun 12 (e.g., calculated speed of a nozzle 26 of the dispensing gun 12).

With further reference to FIG. 1, the dispensing gun 12 includes a housing 20, a valve 22 with a valve actuator 24, a nozzle 26, and a controller 28. In some embodiments, the controller 28 is enclosed in a controller enclosure 30. The controller enclosure 30 may enclose various other components of the dispensing gun 12. For example, the dispensing gun 12 may also include a processor 32 and an inertial measurement unit 34 that are enclosed in the controller enclosure 30. In other embodiments, the processor 32 and the inertial measurement unit 34 are supported by the housing 20 at various other positions. In still other embodiments, the processor 32 and/or the inertial measurement unit 34 are housed remotely from the housing 20, such as on the operator's person (e.g., on a glove worn by the user). The systems and components may be individually or collectively powered by a power supply or power supplies (not shown) that is/are onboard with the various components or remote from the system, either via a wired or wireless configuration.

The housing 20 is operable to support various components of the dispensing gun 12, including, at least in some embodiments, the valve 22 and valve actuator 24, the nozzle 26, the controller 28, the processor 32, and the inertial measurement unit 34. The housing 20 may also define a handle 36, or have a handle portion 36. The dispensing gun 12 further includes a fluid intake 38 coupled to the housing 20. The fluid intake 38 is operable to receive fluid (e.g., pressurized fluids including, but not limited to, sealant, paint, coatings, and so forth). The fluid intake 38 may be positioned at various positions about the housing 20, for example on the handle 36 as shown in FIG. 1. The fluid intake 38 is fluidly coupled to the valve 22 through which the pressurized fluid travels and to the nozzle 26 out of which the fluid is expelled.

According to some embodiments, the dispensing system 10 includes the housing 20, the inertial measurement unit 34 supported by the housing and operable to sense linear and rotational acceleration of the housing 20, the nozzle 26 supported by the housing 20 operable to expel a fluid, the pressure source 14 in fluid communication with the housing 20 and the nozzle 26 and operable to pressurize the fluid, the valve 22 positioned fluidically upstream from the nozzle 26 and operable to regulate fluid flow to the nozzle 26, and the controller 28 operable to receive an application value relating to a predetermined volume of fluid to be applied to a surface of an article (e.g., volume of fluid per linear unit). The controller 28 is further operable to receive movement data relating to the linear and rotational acceleration of the housing 20 sensed by the inertial measurement unit 34, and to regulate the valve 22 based on the movement data and the application value.

As previously discussed, the housing 20 may support many of the components of the dispensing gun 12. The housing 20 may be shaped in a variety of configurations. The housing 20 may include a handle 36 extending from the body 40 of the housing 20. The handle 36 may be shaped to conform to the hand of a user. The handle 36 may extend from various positions of the body 40 and may position the hand in various orientations. As illustrated, the handle 36 extends from the lower surface of the body 40 and positions the user's hand similar to that of a power tool (e.g., an electric drill). The handle 36 may also be positioned from a back surface of the body 40. The positioning of the handle 36 may be provided in various orientations to allow the user to have more ergonomic positioning or to have better control of the dispensing gun 12 during use. The housing 20 also supports a trigger 42 which is operable to be activated to initiate and sustain discharge of the pressurized fluid from the dispensing gun 12. The handle 36 may include a trigger guard 43, or any of a variety of safety features.

The inertial measurement unit 34 is supported by the housing 20 and is operable to sense linear and rotational accelerations of the housing 20. Various inertial measurement units 34 may be implemented either alone or in combination, including accelerometers, gyroscopes, and magnetometers. The inertial measurement unit 34 is operable to sense the linear accelerations and rotational accelerations (i.e., changes to pitch, roll, and yaw). The inertial measurement unit 34 generates data representing the accelerations sensed, the data is then used to calculate velocity of the housing 20 as well as orientation of the housing 20 within a coordinate system. The inertial measurement unit 34 is calibrated to provide reference upon initialization of the system or as otherwise initiated by the user. For example, in an embodiment, prior to use of the system, the value of the inertial measurement unit 34 is set at zero. The system must be activated while the dispensing gun 12 is at rest to allow for the inertial measurement unit 34 to properly be calibrated at the initiation of dispensing. In some embodiments, the system periodically recalibrates. For example, the inertial measurement unit 34 is reset every time the trigger is released, thus necessitating that the system must be activated while the dispensing gun 12 is at rest. This limits any accumulation of errors that might occur with the inertial measurement unit 34. Other methods of calibrating the system may also be implemented. The system may also be calibrated for volume of fluid dispensed. This can occur by dispensing a volume of fluid from the system onto a medium with a known mass. The mass of the medium with the dispensed fluid is then measured. The volume of the dispensed fluid can then be calculated from the mass of the dispensed fluid. The volume of dispensed fluid (e.g., actual dispensed volume) can then be compared to the volume of fluid the system internally measured as the intended dispensed volume. The actual dispensed volume and the intended dispensed volume are compared and the system is recalibrated based on these two values. This process can be repeated several times to more accurately calibrate the dispensing function of the system. The calibration may continuously occur in order to maintain consistent dispensing which allows trimming of the system for the calibration factor in order to provide consistent dispensing, which can accommodate various factors such as change of viscosity of the fluid, pressure drops, and so forth.

Figure 2A:
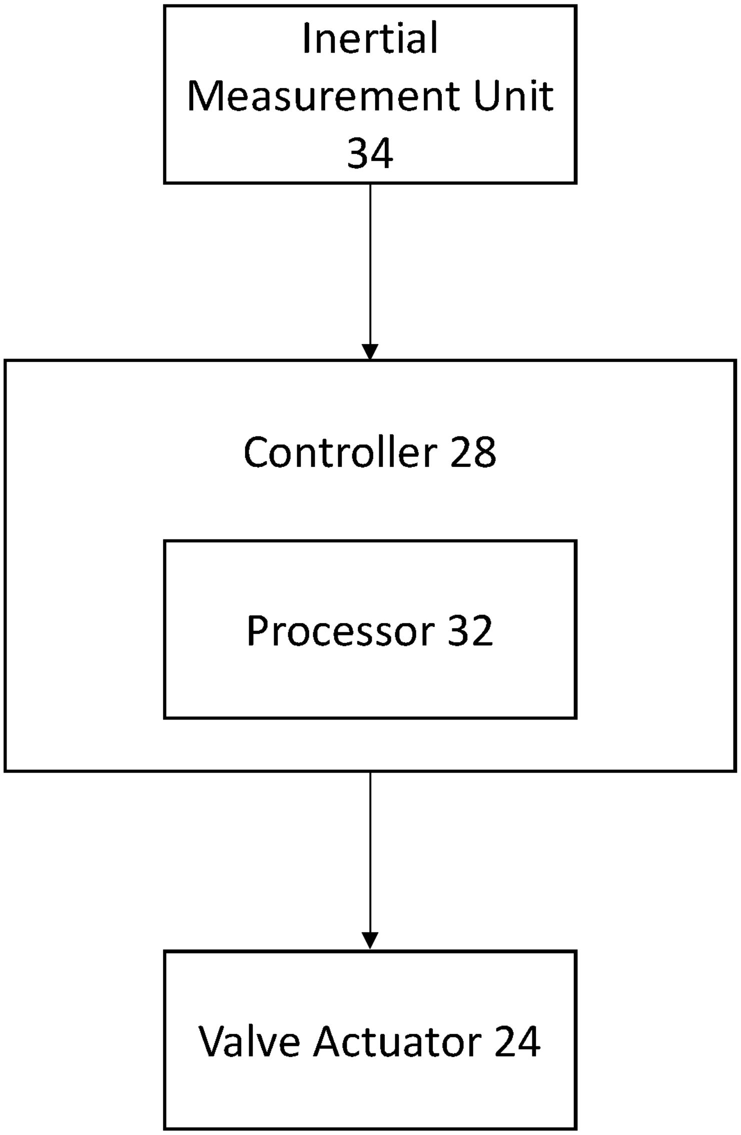
FIG. 2A is a schematic view of an embodiment of an inertial measurement unit, a controller with a processor, and a valve actuator for a dispensing gun of a fluid dispensing system, according to some examples.
Figure 2B:
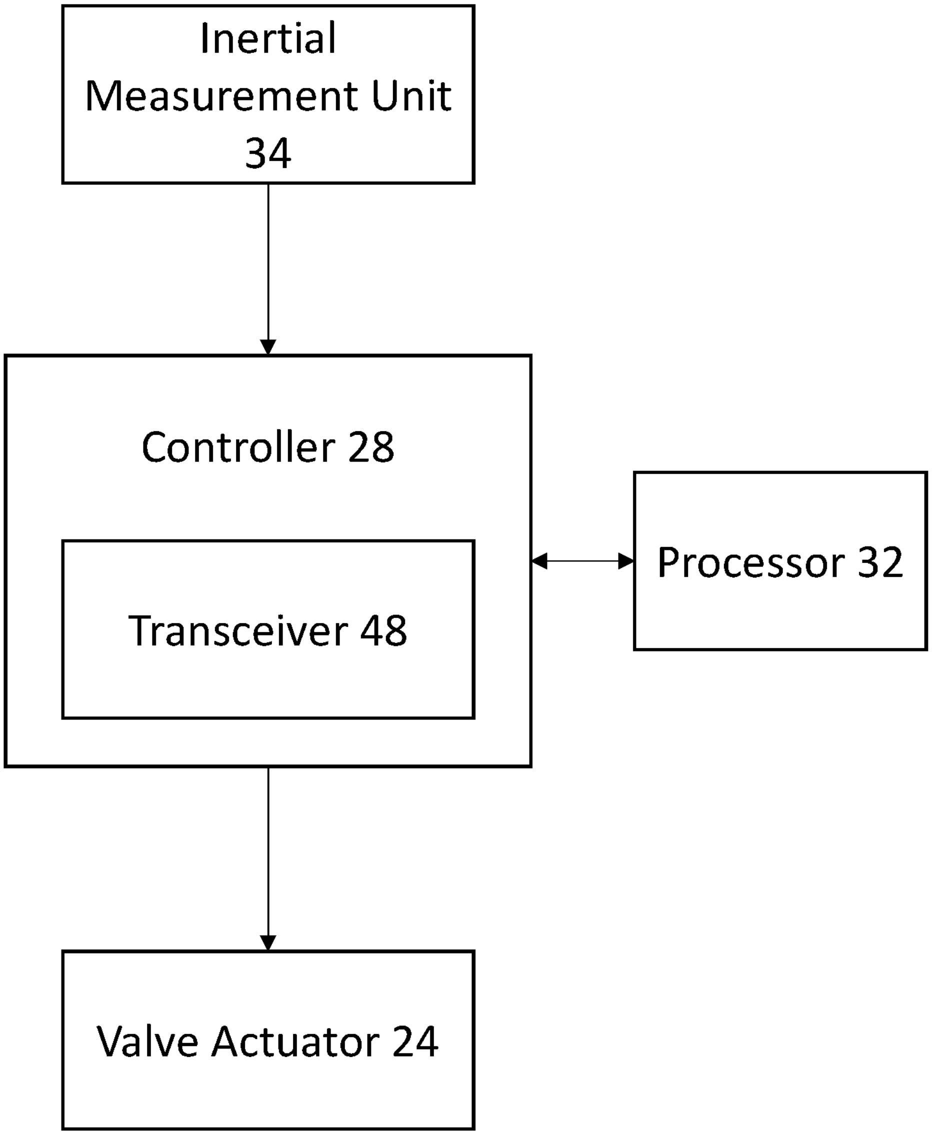
FIG. 2B is a schematic view of an embodiment of an inertial measurement unit, a controller with a wireless transceiver, and a valve actuator for a dispensing gun of a fluid dispensing system, according to some examples.

The calculation of the velocity (e.g., relative velocity) and/or orientation of the housing 20 can occur on the inertial measurement unit 34 or at a processor 32 that is either supported on the housing 20 or is remote from the dispensing gun 12 (e.g., wireless configuration or cloud-based computing) (see FIG. 2A). For example, the dispensing gun 12 may include a wireless transceiver 48 operable to send and receive wireless transmissions (see FIG. 2B). In use, linear and rotational accelerations are integrated into an X, Y, and Z coordinate system to determine velocity and orientation of the dispensing gun 12. The velocities are added using vector arithmetic to calculate the speed of the nozzle 26. Any number of coordinate systems may be implemented. For example, in those embodiments in which the dispensing gun 12 is rotationally constrained and constrained a specific distance from the target surface, a three-dimensional coordinate system may not be necessary. In some embodiments, a magnetometer may be implemented to stabilize any rotational acceleration information generated by the gyroscopes. Linear and rotational accelerations are integrated to X, Y, and Z velocity and orientation, and the velocities are added using vector arithmetic to calculate the speed of the nozzle 26 via the processor 32. For example, the processor 26 receives data relating to the linear and rotational accelerations and is operable to calculate the speed and orientation of the nozzle 26 within the coordinate system.

Figure 3A:
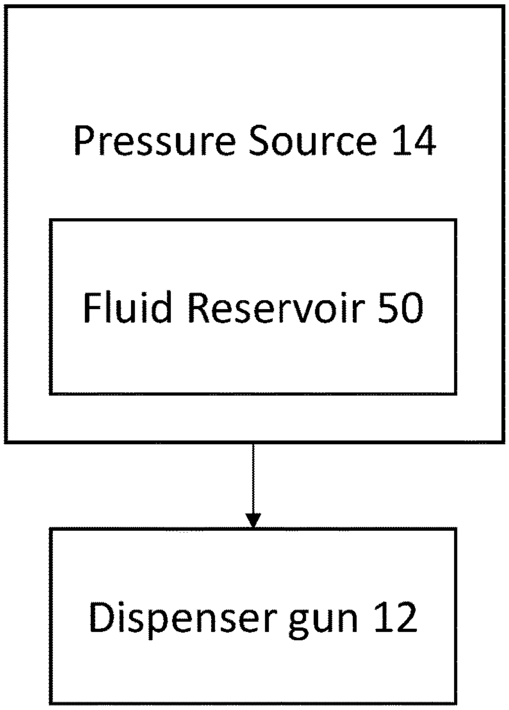
FIGS. 3A-3D are schematic views of an embodiment of a pressure source and fluid reservoir for a fluid dispensing system, according to some examples.
Figure 3B:
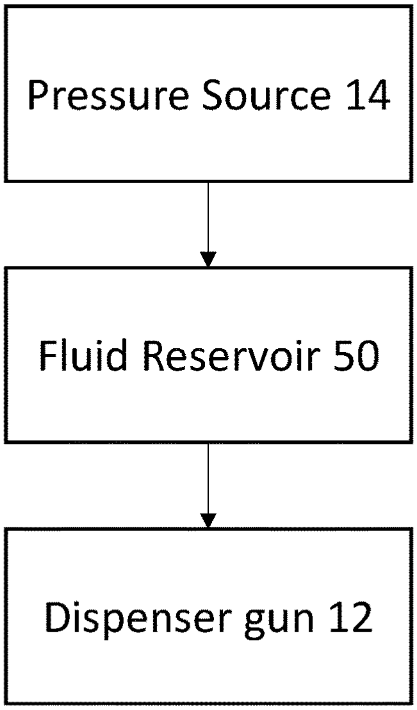
Figure 3C:
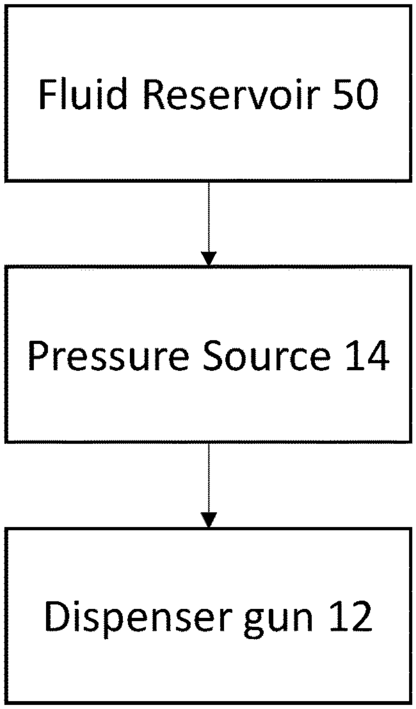
Figure 3D:
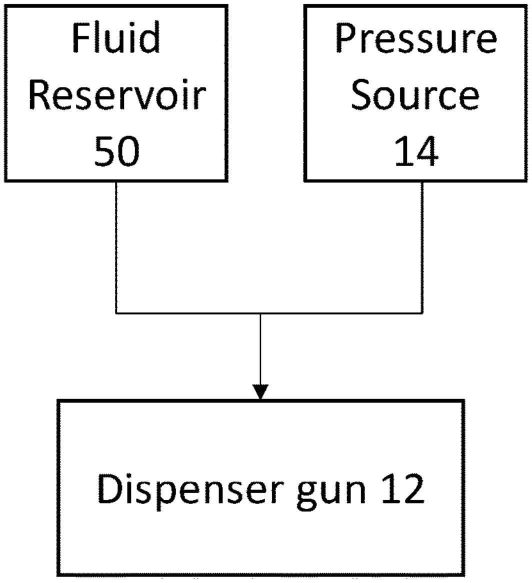

The pressure source 14 is used to pressurize the fluid for dispensing from the dispensing gun 12. The pressure source 14 pressurizes the fluid, and may be, for example, a fluid pump. In some embodiments, the pressure source 14 pressurizes air, the pressurized air being used in combination with the fluid (e.g., sealant, paint, or other surface treatments) to dispense the fluid. In some embodiments the pressure source 14 may pressurize the fluid within the pressure source 14. For example, the pressure source 14 may include a fluid reservoir 50 which is pressurized (see FIG. 3A). In other embodiments, the fluid reservoir may be positioned separate from the pressure source 14 (see FIGS. 3B-3C). The fluid may be pressurized in the fluid reservoir 50, at the pressure source 14, or downstream from the fluid reservoir 50 and the pressure source 14 (e.g., at the dispensing gun 12). The pressure source 14 and/or the fluid reservoir may include, but is not limited to, a fluid pump. Any number of types of pressure sources 14 may be implemented in combination with the principles discussed herein. In some embodiments, the fluid reservoir 50 and the pressure source 14 each feed into the dispensing gun 12, either individually or are in combination fluidically between the pressure source 14/fluid reservoir 50 and the dispensing gun 12 (see FIG. 3D).

Figure 4:
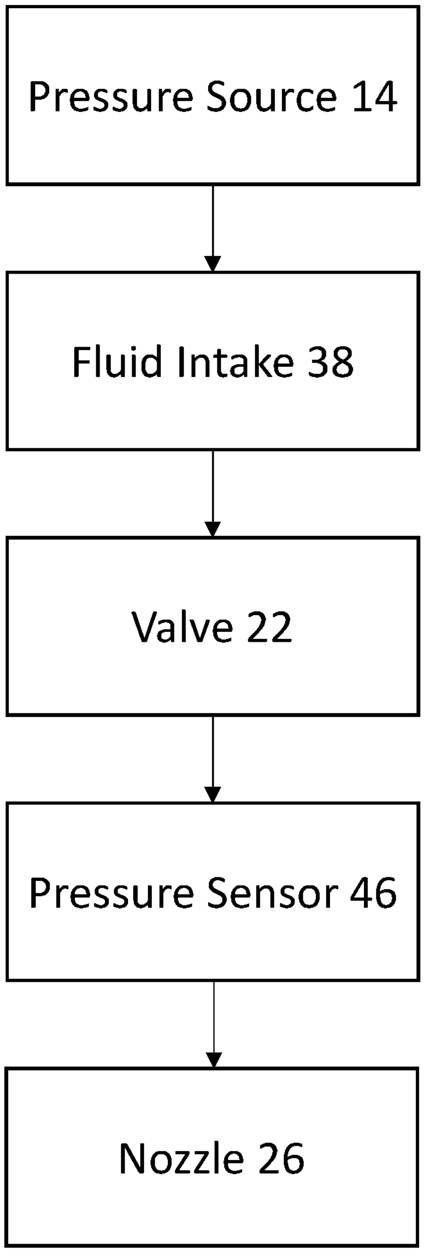
FIGS. 4-6 are schematic views of components of embodiments of fluid dispensing systems with various components through which the fluid flows as the fluid is dispensed by each fluid dispensing system, according to some examples.
Figure 5:
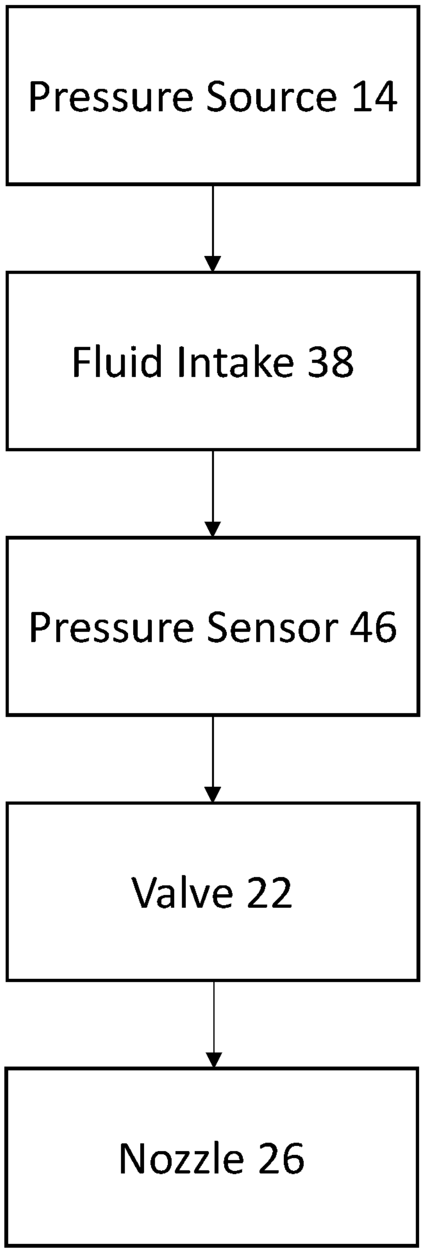
Figure 6:
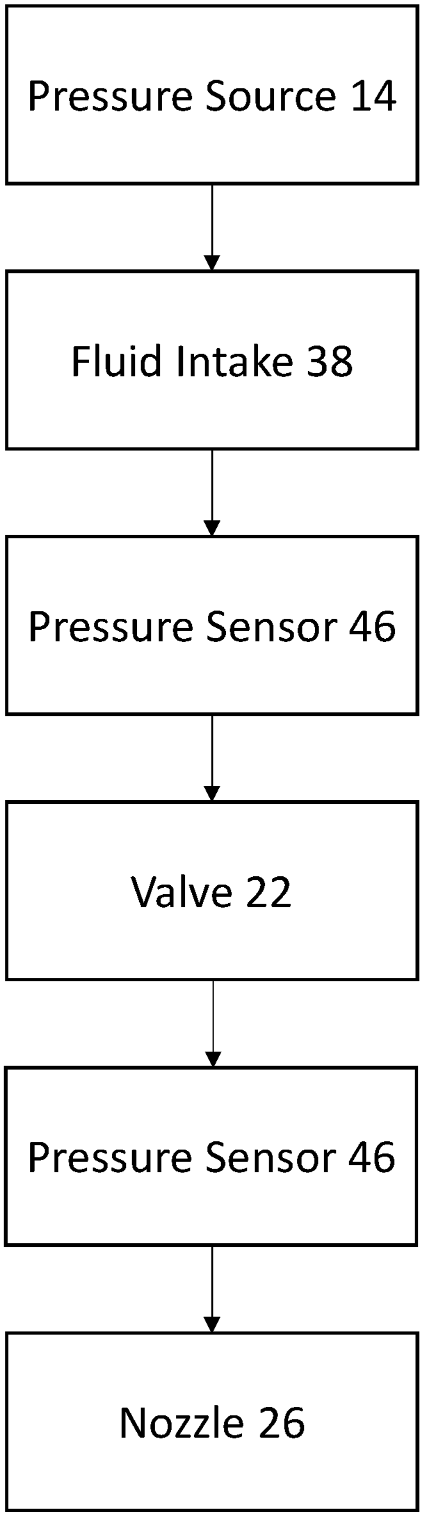

Referring to FIGS. 4-6, the valve 22 is positioned fluidically upstream from the nozzle 26 and is operable to regulate fluid flow to the nozzle 26. The valve 22 may be supported on the housing 20 of the dispensing gun 12 or may be supported fluidically upstream from the dispensing gun 12, for example, on the pressure source 14 or between the pressure source 14 and the dispensing gun 12. Any type of valve may be implemented with the fluid dispensing system 10. The valve 22 is operable to regulate the flow of the pressurized fluid to the nozzle 26. In some embodiments, the valve 22 is adjustable along a spectrum of settings (e.g., infinitely adjustable between open and closed positions), allowing the valve 22 to be adjusted to provide a specific flow rate of fluid through the nozzle 26. The valve actuator 24 enables the valve 22 to be adjusted to the various settings for controlling the flow rate of the fluid. The valve actuator 24 may be operably coupled to the controller 28 which controls the valve 22 and/or valve actuator 24 based on parameters determined by the fluid dispensing system that are discussed in more detail hereafter.

The nozzle 26 is operable to expel the fluid from the dispensing gun 12. The nozzle 26 may be selected based on a variety of factors, including a desired dispensing patterns, fluid or pressure handling capability, or other characteristic suited for a specific application (e.g., bead or spray shape or orientation during delivery). In various examples, the nozzle 26 may be interchanged on the dispensing gun 12 with a nozzle of different design when the dispensing gun 12 is to be used for a different application (e.g., different fluid, different surface, different distance from a surface, different spray pattern, or other variation). In order to achieve a desired dispensing pattern on the surface, the nozzle 26 and system setup may require that the nozzle 26 be positioned a specific distance from the surface, for example when forming a sealant bead with a specific geometry (e.g., shape and size). In some embodiments, the nozzle 26 may be constrained at a specified distance from the surface. For example, the housing 20 may include an attachment portion 44 that is operable to interface with the surface, the workpiece, or an adapter (not shown). When interfaced with the surface or the workpiece, either directly or indirectly via an adaptor, the nozzle 26 is positioned and constrained at a specified distance from the surface in order to maintain the specified distance between the nozzle 26 and the surface for achieving the desired dispensing pattern on the surface. For example, when the fluid dispensing system 10 is being implemented to provide sealant to fenestration units such as windows, the dispensing gun 12 is operable to interface (e.g., coupled to rails) with the fenestration unit at a specified distance, constraining the nozzle 26 to the specified distance from the surface. When the dispensing gun 12 is constrained at a specified distance from the surface, the dispensing gun 12 is still operable to translate and in some embodiments rotate relative to the surface. For example, the dispensing gun 12 may translate across the frame components of the fenestration unit when sealant is being expelled from the nozzle 26.

As the nozzle 26 is being translated and/or rotated relative to the target surface, the controller 28 is operable to modulate the valve actuator 24 in order to achieve the desired coating of the surface. The controller 28 receives the data generated by the inertial measurement unit 34 and modulates the volume of fluid expelled from the nozzle 26 in order to achieve a uniform coating of the surface in view of accelerations of the nozzle 26 relative to the surface. For example, as the dispensing gun 12 is being utilized to provide sealant to a fenestration unit, a user may not be able to move the dispensing gun 12 at a constant velocity across the fenestration unit. When the inertial measurement unit 34 senses accelerations, the controller 28 modulates the valve actuator 24 in order to account for the change in velocity to still provide the desired volume of fluid to the surface despite the acceleration. The processor 32 determines the accelerations of the dispensing gun 12 (e.g., more specifically the nozzle 26) in the tool coordinate system based on data received from the inertial measurement unit 34. The data is used to calculate the velocity of the dispensing gun 12. Based on the velocity (or speed when the directionality is stripped out of the calculation), the processor 32 determines in real time the volume of fluid to be dispensed from the nozzle 26 in order to achieve the predetermined volume of fluid per linear unit.

The modulation of the valve actuator 24 to achieve uniform coating of a target surface in view of accelerations of the dispensing gun 12 is achieved substantially in real time. For example, as the inertial measurement unit 34 senses accelerations of the dispensing gun 12 during the expelling of the fluid, the processor 32 translates those accelerations into a coordinate system. In some embodiments, the processor 32 is capable of further processing of the data including data filtration to remove erroneous data and so forth. The processor 32 is preloaded and/or programmable to include a profile associated with the nozzle 26 and the spray pattern. The nozzle profile may be represented in a variety of manners including, but not limited to, volume per unit of time. The profile may also include the various volumes per unit of time expelled from the nozzle 26 based on the setting/position of the valve actuator 24. The processor 32 is also preloaded and/or programmable to include an application profile relating to the desired application of the fluid to the target surface. For example, the user can enter parameters for the desired bead into the system. This can be accomplished via onboard interfaces or remote interfaces (e.g., a computer or cell phone with a wired or wireless connection). The application profile may be represented in a variety of manners, including but not limited to, volume per linear unit. When the dispensing gun 12 is actively expelling fluid, the processor 32 determines how much fluid (e.g., volume of fluid) should be expelled at the rate that the nozzle 26 is travelling in order to achieve the desired application (e.g., volume per linear unit). The controller 28 is operable to modulate to the valve actuator 24 in order to achieve the desired application of the fluid on the surface. Because the user is manually articulating the dispensing gun 12, the nozzle 26 may be under constant acceleration conditions (e.g., an unsteady hand is constantly subjecting the dispensing gun 12 to various accelerations). In order to account for these accelerations, the dispensing gun 12 is constantly sensing and adjusting the valve 22 to account for the accelerations.

For example, the inertial measurement unit 34 is constantly sensing accelerations (e.g., via three orthogonal accelerometers). The data generated by the inertial measurement unit 34 are integrated with respect to time to provide velocity vector for coordinate transformation. The velocity vector is fed to a control algorithm that produces signals to control the position of the valve actuator 24 that controls the rate of fluid flow (e.g., sealant flow). The velocity vectors are constantly updated and integrated to control the valve actuator 24. As the dispensing gun 12 dispenses the fluid (e.g., a sealant), the delivery rate is controlled to produce a substantially uniform application (e.g., substantially uniform bead size for the sealant).

In some embodiments, the dispensing gun includes a pressure sensor 46. The pressure sensor 46 is in fluid communication with the fluid proximate the nozzle 26 (e.g., immediately prior to the nozzle 26 in the fluid flow path). The pressure sensor 46 is operable to sense the pressure of the pressurized fluid at or immediately prior to the nozzle 26 in order to provide an accurate pressure of the fluid to be expelled such that the calculation of the volume of fluid expelled over a period is accurate and the valve actuator 24 can be appropriately adjusted (see FIG. 4). The controller 28 is operable to adjust delivery rate of the fluid based on the pressure sensed by the pressure sensor 46. By placing the pressure sensor 46 at an upstream position in the system, the pressure sensed at the nozzle 26 can be used to appropriately calibrate the valve actuator 24 which allows for increased accuracy in dispensing the fluid and achieving the desired application of the fluid on the surface. The control algorithm adjusts the fluid flow such that the fluid pressure measured at the inlet of the nozzle 26 is correct for the desired fluid dispense rate. This permits calibration of the system when the flow properties of the fluid change. This also permits long-term measurement of fluid flow for comparison to the long-term commanded delivery. This information is used for real-time refinement of the system calibration. The pressure sensor 46 or a second pressure sensor may also be positioned upstream from the valve 22 in order to measure the incoming pressure of the fluid (see FIGS. 5 and 6). This information is used to provide a feedforward control term to improve the transient responsiveness of the system. This allows the flow rate of the fluid dispensed from the dispensing gun 12 to be adjusted responsive to the pressure at the nozzle 26. In some embodiments, a flow meter may be implemented, and the information obtained by the flow meter may be used to determine the appropriate settings for dispensing fluid. Any appropriate meter may be implemented to obtain the appropriate data for determining the volume of fluid being expelled from the dispensing gun 12. In those embodiments using multiple pressure sensors, one of the pressure sensors may be placed downstream from the valve 22 in order to determine the pressure drop and to dynamically adjust the valve 22 based on various considerations including changes in pressure, viscosity, and so forth.

In view of the foregoing, a method of providing a uniform application of fluid by regulating fluid flow from a fluid dispensing system is provided. The method includes setting an application value relating to a predetermined volume of a fluid to be applied to a surface, pressurizing the fluid, sensing movement data relating to linear and rotational acceleration of a housing, determining a valve setting of a valve based movement data, and modulating the valve in response to the linear and rotational acceleration of the housing to provide the predetermined value of fluid to the surface.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A fluid dispensing system for dispensing fluid onto an article, the fluid dispensing system comprising:

a housing;

an inertial measurement unit supported by the housing and configured to sense linear and rotational acceleration of the housing relative to a surface of the article;

a nozzle supported by the housing configured to expel a fluid;

a pressure source in fluid communication with the housing and the nozzle and configured to pressurize the fluid;

a valve positioned fluidically upstream from the nozzle and configured to regulate fluid flow to the nozzle; and a controller configured to receive an application value relating to a predetermined volume of fluid to be applied to the surface of the article, to receive movement data relating to the linear and rotational acceleration of the housing sensed by the inertial measurement unit, and to regulate and adjust the valve in response to the movement data and the application value, the controller including a processor configured to calculate a velocity of the nozzle based on the movement data, wherein the movement data is collected on an X, Y, and Z coordinate system.

2. The fluid dispensing system of claim 1, wherein the processor is configured to determine orientation of the nozzle based on the movement data.

3. The fluid dispensing system of claim 1, further comprising a valve actuator configured to actively control the valve.

4. The fluid dispensing system of claim 1, further comprising a pressure sensor at an upstream position in fluid communication with the fluid proximate the nozzle, wherein the controller is configured to regulate the valve based on a pressure sensed by the pressure sensor.

5. The fluid dispensing system of claim 4, wherein the controller is configured to adjust delivery rate of the fluid based on the pressure sensed by the pressure sensor.

6. The fluid dispensing system of claim 1, wherein the nozzle is configured to expel a sealant that forms a sealant bead to the surface.

7. The fluid dispensing system of claim 1, further comprising an adapter configured to couple the housing to the article and maintain the nozzle a predefined distance from the surface of the article.

8. The fluid dispensing system of claim 1, wherein the fluid dispensing system is configured to allow manual operation of the fluid dispensing system by a user, wherein the movement data includes linear and rotational acceleration of the housing created by movement of the user and the processor is configured to regulate and adjust the valve based at least in part on the movement of the user.

9. A dispensing gun configured for dispensing fluid onto an article, the dispensing gun comprising:

a housing;

an inertial measurement unit supported by the housing and configured to sense linear and rotational velocity of the housing relative to an area of the article;

a nozzle supported by the housing configured to expel a fluid;

a valve supported by the housing and positioned fluidically upstream from the nozzle and configured to regulate fluid flow to the nozzle;

a controller configured to receive an application value relating to a predetermined volume of fluid to be applied to the area of the article, to receive movement data relating to the linear and rotational acceleration of the housing sensed by the inertial measurement unit, and to regulate and adjust the valve based on the movement data and the application value, the controller including a processor configured to calculate a velocity of the nozzle based on the movement data, wherein the movement data includes three degrees of freedom.

10. The dispensing gun of claim 9, wherein the processor is configured to perform a coordinate transfer of the movement data to a coordinate system to determine an orientation of the nozzle.

11. The dispensing gun of claim 9, further comprising a valve actuator configured to actively control the valve, the valve actuator being infinitely adjustable, and wherein the valve actuator is adjusted based on the movement data in order to provide a desired flow rate through the nozzle.

12. The dispensing gun of claim 9, further comprising a pressure sensor in fluid communication with the fluid proximate the nozzle.

13. The dispensing gun of claim 12, wherein the controller is configured to regulate the valve based on a pressure sensed by the pressure sensor.

14. The dispensing gun of claim 13, wherein the controller is configured to adjust delivery rate of the fluid based on the pressure sensed by the pressure sensor.

15. The dispensing gun of claim 14, wherein the nozzle is configured to expel a sealant that forms a sealant bead to a surface.

16. The dispensing gun of claim 15, further comprising an adapter configured to couple the housing to an article and maintain the nozzle a predefined distance from the surface of the article.

17. The dispensing gun of claim 9, wherein the controller is configured to calibrate the valve based on sensed pressures.

18. The dispensing gun of claim 9, further including a magnetometer operably coupled to the housing and configured to stabilize rotational acceleration of the housing.

19. The dispensing gun of claim 9, wherein the dispensing gun is configured to allow manual operation of the fluid dispensing system by a user, wherein the movement data includes linear and rotational acceleration of the housing created by movement of the user and the processor is configured to regulate and adjust the valve based at least in part on the movement of the user.

20. The dispensing gun of claim 19, wherein the inertial measurement unit is configured to substantially constantly sense the movement data to account for movements of the user during operation of the dispensing gun.

* * * * *